United States Patent Office 3,525,483
Patented Aug. 25, 1970

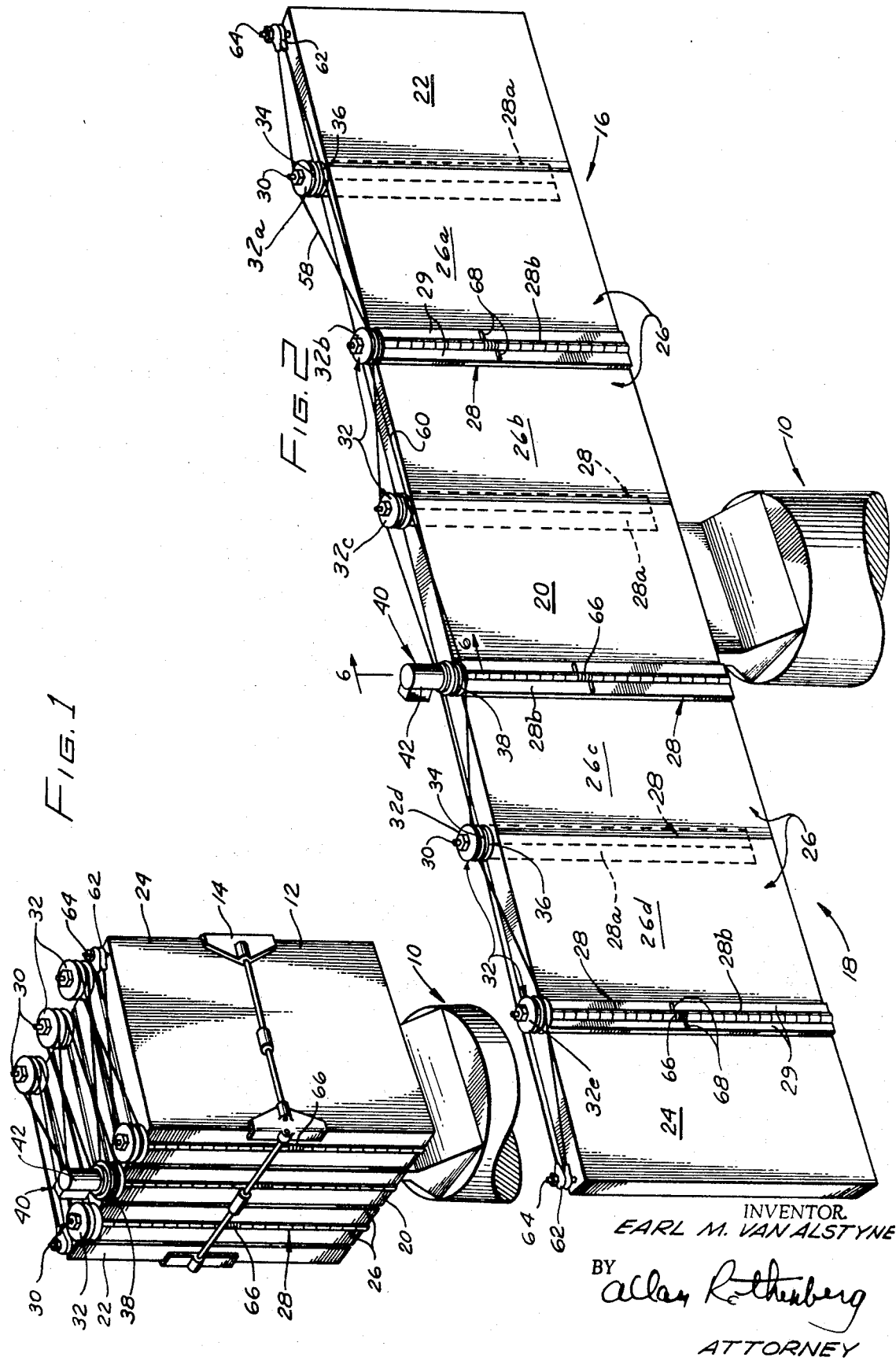

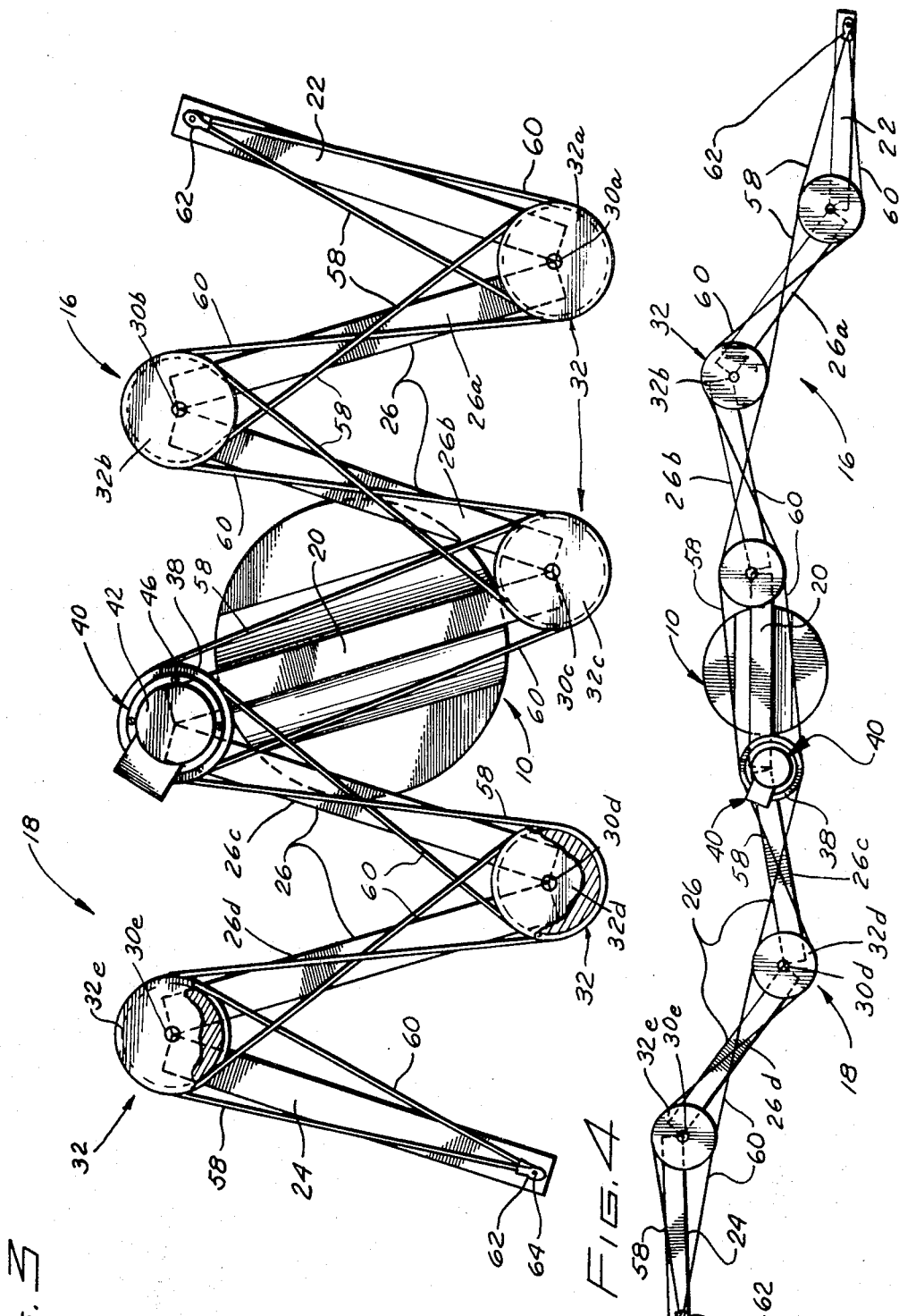

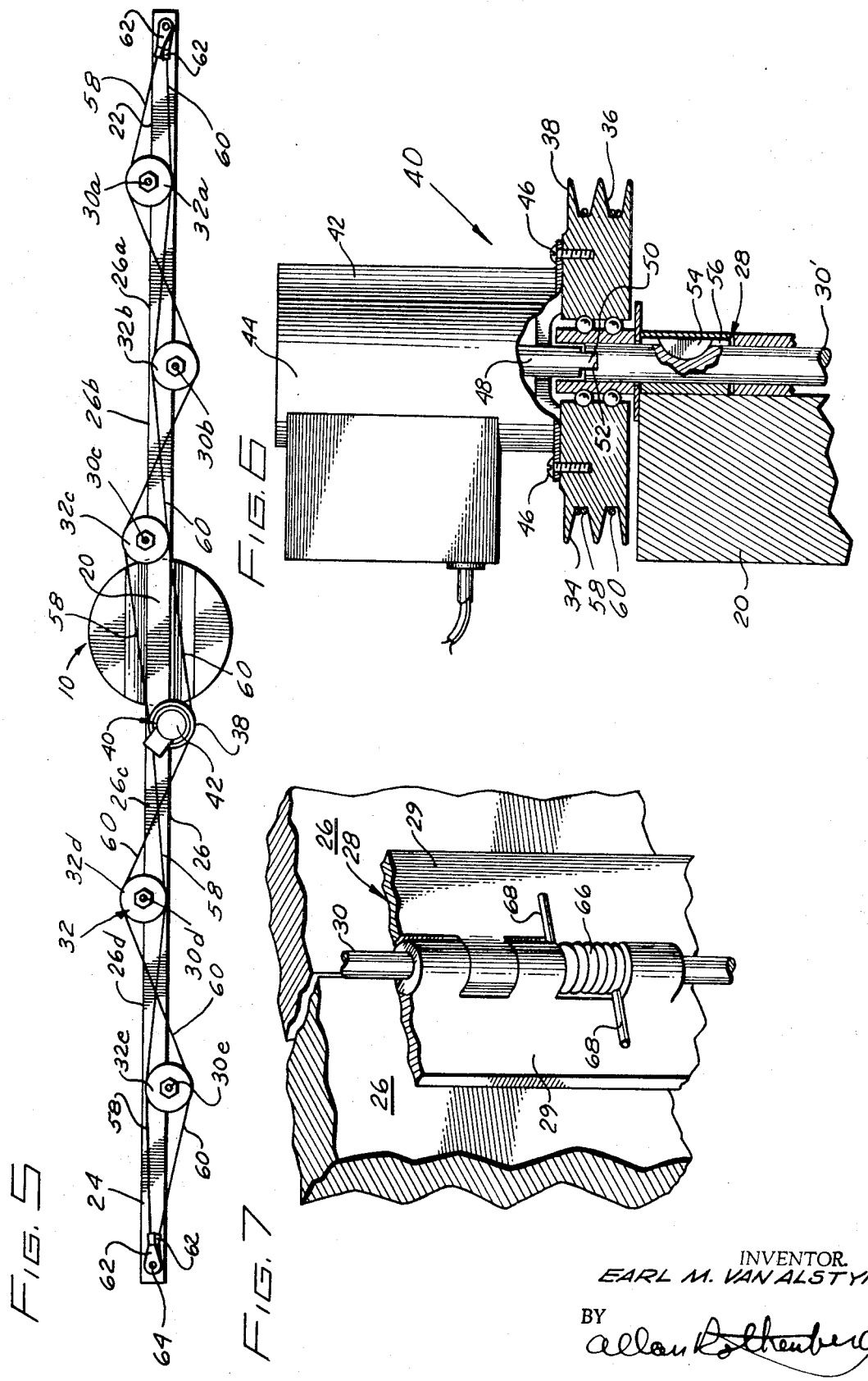

3,525,483
DEPLOYMENT MECHANISM
Earl M. Van Alstyne, Laguna Hills, Calif., assignor to North American Rockwell Corporation
Filed Jan. 17, 1968, Ser. No. 698,599
Int. Cl. B64g 1/10
U.S. Cl. 244—1                                           10 Claims

ABSTRACT OF THE DISCLOSURE

A deployment to selectively deploy and retract a pair of oppositely disposed arrays of panels. A central panel is secured to a base structure such as a spacecraft, and an equal number of accordian hinged panels are symmetrically arranged on opposite sides of the central panel. Positive spring aided deployment and retraction of the panels are controlled by a dual cable system which engages a series of pulleys carried by the panels. Movement and location of the panels are symmetrical and rate of motion of each panel is the same at the same point in time.

BACKGROUND

There are various known arrangements of foldable and unfoldable mechanisms and apparatus for actuating these mechanisms from closed to open position and visa versa. Such mechanisms encompass actuating apparatuses involving complex and heavy units which substantially increase the load of a space vehicle in which weight must be minimized both for launch and prolonged space operations, where limited power is available.

In addition to this weight problem a further consideration is optimum weight distribution to provide a balanced state. This not only relates to the load itself, but to loads in deployed condition. If an unbalanced configuration in a folded condition exists problems are added to a launch system. If an unbalanced configuration exists after a fully deployed position occurs, especially in an zero gravity condition, then spacecraft control problems are increased. An unbalanced state may cause high roll rates, tumbling or rotations to such an extent as to render a space operation or experiment ineffectual.

Therefore, one of the objects of this invention is to provide a mechanism capable of deployment in such a manner as to be in a symmetrically balanced state at all times during motion from an unfolded position to extended position.

A major structural problem inherent in most deployable structural systems for space application is the achievement of structural integrity subsequent to an automatic deployment phase. Some systems have the additional problems of positioning and maintaining an antenna to precise location relative to the spacecraft configuration. The severity of this problem drastically increases with decrease of access and packaging in a spacecraft.

It is therefore desirable that a compact bundle be so arranged that it may be preferably enclosed in an aerodynamic shroud or fairing for launch and at the proper time after launch the shroud be jettisoned to allow deployment of the mechanism to extended or operative condition. Under the controlled system described herein a symmetrical distribution of weight is maintained and a successful mission can be more readily achieved.

Previous systems have employed telescoping extensions with elements of circular or rectangular cross-section and folding devices including mechanical scissors and inflatable bags. In many situations it is desirable to employ a lightweight extensible structure which can be retracted for storage or transporting.

For manned flights in particular, prominent problems include restriction of the astronauts during extra vehicular activity and contamination resulting from removal of human waste in space. An array of mechanism with the capability of being retracted offers advantages in allowing the astronauts freedom of movement during an extra vehicular activity to a degree which is not available with an array of mechanism or objects which cannot be retracted. It is also advantageous because the objects may be retracted during the period when waste is being jettisoned, thus avoiding contamination of any sensitive mechanisms such as solar cells. The technique of deployment herein described will permit multiple deployments and safe storage for the many sensitive apparatuses to be used in space flights.

BRIEF SUMMARY

In carrying out the principles of the invention in accordance with a preferred embodiment thereof, there is provided a central member or structural panel and one or more groups of movable members or panels hingedly interconnected to each other in end to end relation for accordion-like folding and unfolding to and from the central member. Cable guide means such as pulleys are provided at the hinged interconnections and cables entrained over the guide means are arranged to be operated to effect a positive folding or unfolding action of the interconnected panels. Considering one group of panels, that is, a group adapted to be folded or unfolded from one side of the central member, two cables are entrained over the cable guide means thereof, the first being entrained in a first direction, clockwise, and the second being entrained in the opposite direction, counterclockwise. Each cable is entrained about opposite sides of consecutively adjacent ones of the cable guides; that is, the first cable is entrained about the first guide at a position on the guide at one side of the group of panels and is entrained about the next guide at a position on the guide on the other side of the group of panels. Thus each cable alternates its point of engagement from side to side of the guides and the two cables for one group engage opposed sides of any one guide. With this arrangement each motion, deployment or retraction, is effected under restraint and under control of mutually opposed forces exerted by the two cables.

Other characteristics, advantages, and objects of the invention, will be more readily appreciated from the following detailed description when taken in connection with the accompanying drawings wherein:

FIG. 1 is a perspective view of one embodiment of the invention showing a panel assembly in a secured folded position;

FIG. 2 is a perspective view showing the panel assembly of FIG. 1 in a fully open position;

FIG. 3 is a top plan view of the panel assembly of FIG. 1 in a position between folded and fully opened condition;

FIG. 4 is a view similar to that of FIG. 3, but showing the panels in a more extended position;

FIG. 5 is also a top plan view of the assembly with the panels extended to complete open position;

FIG. 6 is a sectional view taken on line 6—6 of FIG. 2; and

FIG. 7 is a partial perspective view of the hinges and spring arrangement.

DETAILED DESCRIPTION

Referring now more specifically to the drawings in which like reference numerals refer to like parts there is shown in FIGS. 1 through 5 a portion of a support structure such as a spacecraft generally indicated at 10.

As shown in FIG. 1 there is illustrated a compact array of folded members or panels 12 which are secured to the body of the spacecraft to provide a base for the array 12 in the condition for storage. In this stored position the members are locked into place by a simple locking means 14, which may include conventional remotely actuable explosive devices for release upon receipt of a command signal thereby freeing the members or panels for movement to an extended position as is further illustrated in other figures.

The structural members 12 are shown in the drawings as panels of a type adapted for use in a solar array since they provide large surface area for mounting of conventional solar energy conversion devices. It is to be understood that many other different types of structural members may be similarly connected for folding and unfolding as may be required for other extensible structures such as antennas and the like.

The array of panels 12 includes separate clusters or groups of individual panels hereinafter referred to as the right hand group 16 and left hand group 18. Centrally located and hingedly connected to each of the groups 16 and 18 is a fixed central panel 20 which is rigidly connected to the base, the space structure 10.

As can be seen in FIG. 2 each group of panels 16 and 18 includes an end panel 22 and 24, respectively, in addition to two intermediate panels 26a, 26b, 26c, and 26d that are pivotly connected to each other in an accordian-like manner. At this point it should be understood that although only two intermediate panels 26 are shown on each side there can be any number of panels added to this array to each of the right and left hand group for the purpose of enlarging the entire array. The panels 26b and 26c are in turn pivotly connected to the central panel 20. The individual panels are interconnected to each other by hinge means generally indicated at 28. As most readily seen in FIGS. 2, 3, and 4 successive hinges are positioned on opposite sides of the panel array.

Thus, the hinging system provides an accordian-like array in which the hinges 28 are arranged in a consecutive allochiral relationship to each other, it being noted that the selected hinges 28a and 28b are identical to each other with the exception that one is a right hand hinge while the other is a left hand hinge so that the description of one will suffice. The hinges 28 are connected to the opposite ends of each consecutively arranged panel by typical flat hinge plate portions 29 (FIG. 7). Each hinge has a conventional interconnecting pivot pin, generally indicated at 30, which is also adapted to be used for additional function that will be hereinafter described in further detail.

There are a plurality of cable guide means, shown in the drawings as pulleys generally indicated at 32. Each of the pulleys is freely mounted at one end of the hinge 28 and rotatably supported on the hinge pivot pins 30a, 30b, 30c, 30d and 30e respectively.

Therefore, the panels and pulleys are adapted to rotate about each pivot pin whereby the pin becomes the common axis for both of the elements.

There is provided a drive pulley 38 (FIG. 6) located adjacent to and at the top edge (as viewed in the drawings) of the center panel 20 and having upper and lower grooves 34 and 36. It is to be noted that the drive pulley 38 can be disposed at either side of the central panel, although, for illustrative purposes it has been shown mounted to the left of the center panel 20. Each of the freely rotatable pulleys 32 comprises a double drum pulley having an upper groove 34 and a lower groove 36 identical to the corresponding parts of drive pulley 38 of FIG. 6.

Although the illustrated embodiment employs a single pulley with double grooves at each hinge, it will be readily appreciated that equivalent operation may be achieved by use of two coaxial single groove pulleys at each hinge.

In FIG. 6 the drive pulley 38 and driving device generally indicated at 40 are shown in more detail. A drive means such as an electric motor 42 is fixedly mounted on the upper face of the drive pulley 38. The housing 44 of the motor 42 is directly secured to the face of the drive pulley by means such as screws 46. The motor has an output shaft 48 coupled to the hingle pin 30 of hinge 28b.

A tongue and groove driving connection enables a tongue 50 on the upper free end of the motor output shaft 48 to mate with a groove 52 on the upper free end of the pin 30. To impart torque to the drive pulley the pin 30 is locked to the pulley by a key 54 which is received in a keyway 56 located in the upper portion of the hinge 28 which is secured to the fixed central panel 20. This arrangement of the output shaft 48 coupled to the locked pin 30 holds the motor shaft from any rotating movement thereby imparting rotating force or movement to the body of the motor which in turn rotates the freely journaled pulley 38 through its full motion of one to one and one-half revolutions. In those arrangements where more than one or two full turns of the drive pulley may be required the motor case is fixed to the panel 20, at a distance from the pin 30 and connected to drive pulley 38 by additional pulleys or gears.

Entrained about the plurality of pulleys is a set of tension members illustrated as cables 58 and 60 respectively. Each cable is made up of a single length of cable having its free ends fixed to the outboard panels 22 and 24 as can be seen in FIGS. 1 through 5. At each free end of the cables there is fixedly secured a fitting 62 secured to a lug 64 at the far end of each outboard panel. The first cable 58 is entrained by a full loop of the cable about the grooves 34 of the pulleys including the drive pulley 38. The second cable 60 is entrained about the lower grooves 36 of each of the adjacent pulleys. The tensions of both cables are maintained nearly equal at all times during the folding and unfolding operations although an increase in tension of one cable with a concomitant decrease in tension of the other is employed to effect positive controlled operation. The pulleys are preferably the same size to keep the cables from becoming slack.

The first cable 58 is arranged opposite to the second cable 60, that is cable 58 is not only located above the second cable 60 but the two cables are looped about the pulley in opposite directions to each other (as viewed in FIG. 3). That is, for example, cable 58 extends from the left most end thereof in a clockwise direction about pulleys 32e and 32c and in a counterclockwise direction about 32d, 32b and 32a, whereas, cable 60 extends counterclockwise about 32e, 32c and 32a and clockwise about 32d and 32b. Therefore, the oppositely disposed loops which are alternated on each of the pulleys as shown in FIG. 4, may be employed to cause the movement of one cable in one direction or a tension tending to unfold the array of panels on one side of the central panel 20; the second cable, being oppositely wound, may be employed in a like manner to impart a tension tending to unfold the opposite array of panels.

As an example, when tension of cable 58 is increased for purposes of unfolding the array only the left hand portion of the cable 58 is tensioned by taking up, on drive pulley 38, that portion of the cable and releasing an excess of cable to the opposite side of the center panel 20. At the same time the right hand array is unfolding taking up the excess of cable 58. In turn, the second cable 60 acts oppositely whereby the right hand portion of the cable 60 is tensioned so as to unfold the right hand array. During this unfolding sequence the left hand portion of the cable 60 is taking up the excess cable. Therefore, if tension in the left hand side is required in the cable 58 to unfold the array, there is a need for an excess of cable 60 to permit the panels to move to the fully extended position. The reverse is then true for the right hand side of the central panel. It is to be understood that all movement of the cables are simultaneous and that the cables are substantially taut at all times due to the unique oppositely arranged cable system. Thus, both cables stay the same length and only their distribution on the pulleys is changed.

The cables, and their entrainment and operation may be described from a different point of view as follows.

Cable 58 (FIG. 3) has its left most end fixed to lug 64 at the free end of panel 24, thence extends to entrainment about pulley 32e contacting this pulley over somewhat less than 180° of its periphery to locate forces that may effect deployment, thence extends to a similar contact with the periphery of pulley 32d, but oppositely entrained (counterclockwise) with respect to its entrainment over pulley 32e. Cable 58 then is entrained in a clockwise direction about drive pulley 38 one or more complete full turns for sufficient driving engagement therewith.

This cable extends from pulley 38 to clockwise entrainment of more than 180°, almost 360°, around the periphery of pulley 32c, which provides a location of forces that effect retraction. Cable 58 thence extends to pulleys 32b and 32a, being entrained about these pulleys by a similar amount, that is, by more than 180° of the periphery of each of these pulleys, counterclockwise about pulley 32b and clockwise about pulley 32a. Cable 58 then extends to a fixed securement at lug 64 on the free end of panel 22. Although the cables need be only entrained about the idling pulleys for less than 360° as shown, it will be readily appreciated that entrainment over each pulley may be increased by 360° or 720°.

Cable 60 is connected in a manner similar to that described for cable 58 except that the right hand portion of the cable 60 is entrained about its respective pulleys 32a, 32b, 32c by less than 180°, and its left hand side is entrained about pulleys 32d and 32e more than 180°, nearly 360°. Cable 60, as is cable 58, is entrained one or more complete turns about the drive pulley 38.

For a consideration of the operation of the described mechanism, reference is made to FIG. 3 wherein the apparatus is shown in a partly deployed or partly retracted position. The ensuing description may be considered in connection with the illustrated apparatus as if it were in the completely retracted position of FIG. 1, although FIG. 3 is chosen herein because the various elements of the apparatus are more readily identified in this installation.

It will be noted that each of the pulleys 32a through 32e inclusive is pivoted on the pivot axis of a pair of adjacent pivotally interconnected panels and each pulley has a diameter sufficient to provide a moment arm to enable application of appropriate folding or unfolding forces as will become more readily apparent as the description proceeds. Thus each cable, as it is entrained about a given pulley, contacts the pulley at a point displaced from the axis that is common to pulley and panel pivotal motion and thus, when tensioned, provides an operating torque about such axis.

For deployment or further extension of the panels, viewing the apparatus in an initial condition as illustrated in FIG. 3, the tensions of the two cables are differentially controlled to cause an increased force urging deployment and a concomitantly decreasing force that restrains deployment. This relative or differential control of opposed forces enables a precisely controlled and symmetrical motion and rate of motion. To this end the drive pulley 38 is caused to rotate in a clockwise direction to cause a pull to be exerted on (increasing tension of) the left-most side of cable 58 while simultaneously paying out (decreasing tension of) the right side of cable 58. This rotation of the drive pulley also causes a pull to be exerted on the right-most side of cable 60 while paying out the left-most side of cable 60.

When an increased tension is thus exerted on the left-most side of cable 58, for example, the end of the latter being fixed at lug 64, and to the end of panel 24, a force is exerted by such tension on the free end of the panel 24, along cable 58, and extending toward and tangentially of the pulley 32e. This force acts at a distance from the pivotal interconnection 30e between panel 24 and adjoining panel 26d and thus exerts a torque upon end panel 24 that urges clockwise rotation of the panel about its pivotal interconnection with the adjoining panel. Similarly tension of cable 58 between pulleys 32d and the driver pulley 38, and between the pulleys 32e and 32d exert appropriate torques on the intermediate panels 26d, 26c, which in effect cause the pivotal interconnections 30e and 30d to move inwardly toward a position of colinearity with each other and with the driver pulley 38, which is the extended position of the apparatus. It will be appreciated that colinearity of pivot points is not achieved since engagement of adjacent panel edges limits the deployed position to that shown in FIG. 5. In other words, the tension of cable 58 exerts upon pivot axis 30e a downward force as viewed in FIG. 3 and exerts an upward force upon pivot axis 30d as viewed in this figure.

At the same time that cable 58 is taken up on the driver pulley 38 by the clockwise rotation thereof it is paid out to permit extension of the right hand group of symmetrical panels. The latter are caused to extend by the tensioning of cable 60. It will be seen that the cables are arranged so that the clockwise rotation of the driver pulley 38 acts to tension the left hand side of cable 58 and the right hand side of cable 60 simultaneously. Tensioning of the right hand side of cable 60 urges pivot 30a, 30b and 30c inwardly toward a position of near colinearity with each other and with the driver pulley 38. Further, while part of the right hand portion of cable 60 is taken up by rotation of the driver pulley this cable is paid out at the left hand side of the assembly to allow extension thereof under forces exerted by the left hand side of cable 58.

FIG. 4 shows a further deployed position and FIG. 5 shows the apparatus in fully deployed position. It may be noted that although central panel 20 is shown in different orientation relative to the drawing itself in FIGS. 3, 4, and 5, all motion takes place relative to such central panel which is fixed with respect to the spacecraft supporting structure 10.

For retraction of the structure from the fully extended position of FIG. 5, motor 42 and drive pulley 38 are reversed in operation to cause the pulley 38 to be operated in the counterclockwise direction. This causes the right hand portion of cable 58 to be tensioned, thus exerting a force on pivot point 30b, for example, that has a component directed toward the left of FIGS. 3, 4, and 5, and tending to effect folding of the panel 26b. Similarly tension of cable 58 between pulleys 32b and 32a exerts a force on panel 26a having a component directed to the left in FIG. 3 at the pivot 30a. So, too, the tension of cable 58 between pulley 32a and the lug 64 includes a component that acts at the free end of panel 22 to effect folding thereof.

The operation ascribed to the right hand portion of cable 58 during retraction is essentially similar to the operation achieved by the left hand portion of cable 60 during retraction. Of course, the right hand portion of cable 60 is paid out during retraction to permit the retraction of the right hand side of the assembly that is effected by tensioning of cable 58.

In addition to the force applied by the drive means 40, there is a biasing means, shown as a coil spring 66 in FIG. 7, centrally located about the hinge pin 30 of each of the hinges 28. The spring 66 is adapted to engage each adjacent panel by extensions 68 so as to apply local force to give a more positive unfolding action in conjunction with the force caused by the cable system. Spring biasing force at each location may be of sufficient magnitude to oppose forces tending to retract the array of panels due to the spacecraft acceleration or perturbation. The combination of the controlled clockwise motor torque with that of the cable system at the time of the unfolding of the panels restrains the spring force at each hinged joint to achieve a controlled and even rate of unfolding. The cable constraint upon the forces exerted by the hinge springs 66 creates preload at the plurality of hinged joints. This contributes to the maintainance of a symmetrical deployment or retraction regardless of the angle of the acceleration force vector.

Thus the unfolding action is effected under control of mutually opposed and relatively controlled forces.

Since both cables 58 and 60 are in tension, increased tension of one tends to effect deployment while concomitant decrease in tension of the other must occur to permit disployment. The springs also tend to effect deployment against the restraint imposed by the tension of the cable that must be paid out to permit deployment. The biasing force of the springs is limited to a fully unfolded position because of the confronting edges of the adjacent panels that meet each other to limit further movement in the direction of the spring force.

Motor torque overcomes the spring force at each hinged joint in order to retract the panels by movement about the hinges.

The invention and its intended advantages will be understood from the foregoing description and it will be apparent that various changes may be made in the form, construction, and arrangement of the parts of the invention without departing from the spirit and scope thereof or sacrificing its material advantages. The embodiment herein before described is merely for the purposes of illustration.

What is claimed is:

1. An extensible structure comprising:
    a plurality of members movably interconnected to each other, wherein said members are hingedly connected to each other in end-to-end relation;
    a pulley mounted at each hinged connection;
    first cable means connected to the members for urging relative motion thereof in a first direction to effect extension thereof;
    second cable means connected to the members for urging relative motion of the members in a second direction to restrain extension thereof;
    said cable means being entrained over the pulleys; and
    means for differentially controlling the first and second cable means whereby motion of the interconnected members is urged by operation of one of said cable means under control of restraint afforded by the other of said cable means, said differential controlling means comprising a motor on one of the members, and a selected one of said pulleys connected to be driven by the motor, said selected pulley having the cables of said cable means oppositely wound thereon.

2. An extensible structure comprising:
    a base;
    a plurality of members, including an end member, pivotally interconnected to each other for accordian-like folding and unfolding to and from the base;
    a driving device mounted on one of the member;
    a guide mounted at pivotal connections of said members; and
    tension means fixed to the free end of said end member and connected to said driving device, said tension means being entrained about opposite sides of consecutively adjacent ones of said guides.

3. A structure as defined in claim 2 wherein said plurality of members comprises:
    first and second groups of members, each including an end member, mounted for opposite extension from opposite sides of the base, the members of each group being pivotally interconnected to each other for accordian-like folding and unfolding from the base.

4. A structure as defined in claim 3 wherein said guides comprise a pulley mounted at each pivotal connection.

5. A structure as defined in claim 4 wherein said tension means comprises:
    first and second cables, each fixed to the free ends of respective ones of said end members, and each wound around said driving device intermediate its ends, each cable being entrained about opposite sides of alternate ones of said pulleys and said cables being on mutually opposite sides at each pulley.

6. A deployable and retractable structure comprising:
    a base structure;
    a central member fixed to said base structure;
    first and second groups of foldable and unfoldable members symmetrically disposed on opposite sides of and pivoted to said central member, each group including an end member, the members of each group being pivotally connected to each other in end to end relation;
    pulley means pivotedly mounted on the axis of each pivotal connection and having upper and lower peripheral grooves;
    a first cable secured to the outer ends of the respective end members, said cable being wound in a first direction about said upper grooves of the pulley means of one group of members in a direction to urge deployment, said cable being wound in a direction about said upper groves of the pulley means of the other group of members in a direction to urge retraction;
    a second cable attached to the end members and entrained about the lower grooves of the pulley means of said one group of members in a direction to urge retraction, said second cable being entrained about the lower grooves of the pulley means of said other group of members in a direction to urge deployment; and
    drive means for differentially controlling said cables.

7. A structure as defined in claim 6 including biasing means for urging deployment.

8. A structure as defined in claim 7 wherein said biasing means comprises:
    a spring mounted to at least one of said pivotal connections and having portions engaging members adjacent thereto.

9. A structure as defined in claim 6 wherein said drive means comprises:
    a motor mounted at said central member and means connected with said motor and said cables and responsive to operation of said motor in one direction to take up the first cable along said one group of members and said second cable along said other group of members, and to simultaneously therewith pay out the first cable along said other group of members and said second cable along said one group of members.

10. A structure as defined in claim 9 wherein said last mentioned means comprises a double grooved pulley connected to be driven by said motor and having said first and second cables oppositely wound thereon.

References Cited

UNITED STATES PATENTS

| 827,017 | 7/1906 | Hofmann | 244—49 |
| 834,287 | 10/1906 | Frey | 160—193 |
| 1,392,669 | 10/1921 | Weis | 244—49 |
| 2,903,896 | 9/1959 | Greene | 74—89.21 |

FOREIGN PATENTS

| 83,209 | 11/1956 | Netherlands. |

FERGUS S. MIDDLETON, Primary Examiner

J. L. FORMAN, Assistant Examiner

U.S. Cl. X.R.

74—89.22; 160—193; 244—49